United States Patent
Su et al.

(10) Patent No.: US 12,187,659 B2
(45) Date of Patent: Jan. 7, 2025

(54) METHOD FOR PREPARING NANO CARBON DIOXIDE CAPTURE AGENT AND APPLICATION OF SAME

(71) Applicant: Beijing Jinxiu New Technology Development Co. LTD, Beijing (CN)

(72) Inventors: Bin Su, Beijing (CN); Wenjin Su, Beijing (CN); Wenwen Su, Beijing (CN)

( * ) Notice: Subject to any disclaimer, the term of this patent is extended or adjusted under 35 U.S.C. 154(b) by 572 days.

(21) Appl. No.: 17/492,552

(22) Filed: Oct. 1, 2021

(65) Prior Publication Data

US 2022/0388922 A1 Dec. 8, 2022

(30) Foreign Application Priority Data

Apr. 1, 2021 (CN) .......................... 202110353047.6

(51) Int. Cl.
| | |
|---|---|
| C05D 9/00 | (2006.01) |
| B01J 20/02 | (2006.01) |
| B01J 20/04 | (2006.01) |
| B01J 20/12 | (2006.01) |
| B01J 20/14 | (2006.01) |
| B01J 20/20 | (2006.01) |
| B01J 20/24 | (2006.01) |
| B01J 20/30 | (2006.01) |

(52) U.S. Cl.
CPC ............ *C05D 9/00* (2013.01); *B01J 20/0207* (2013.01); *B01J 20/043* (2013.01); *B01J 20/12* (2013.01); *B01J 20/14* (2013.01); *B01J 20/205* (2013.01); *B01J 20/24* (2013.01); *B01J 20/3021* (2013.01); *B01J 20/3085* (2013.01)

(58) Field of Classification Search
CPC ....... C05D 9/00; B01J 20/0207; B01J 20/043; B01J 20/12; B01J 20/14; B01J 20/205; B01J 20/24; B01J 20/3021; B01J 20/3085
See application file for complete search history.

(56) References Cited

U.S. PATENT DOCUMENTS

2018/0036713 A1* 2/2018 Li ........................ B01J 20/3085

FOREIGN PATENT DOCUMENTS

| | | | | |
|---|---|---|---|---|
| CN | 108097206 A | * | 6/2018 | ............ B01J 20/165 |
| CN | 108212103 A | * | 6/2018 | ............. B01J 20/06 |
| WO | WO 2017/081631 A1 | * | 5/2017 | ............. B01J 37/02 |

* cited by examiner

*Primary Examiner* — Wayne A Langel

(57) ABSTRACT

A method for preparing a nano carbon dioxide agent and an application of the agent are disclosed. The method takes cationic surfactant modified bentonite as a carrier, and the $CO_2$ nano agent prepared by loading cationic surfactant modified chitosan, graphene oxide and organic alkali modified hydrotalcite has the photocatalytic effect of nano materials, which can enhance photosynthesis, increase photosynthetic rate, inhibit light respiration at night, synthesize chlorophyll for crop growth, accumulate three essential elements of carbon, hydrogen and oxygen for crop growth, effectively absorb, synthesize and transform organic components such as nitrogen, phosphorus and potassium in soil, fully promote the gestation, growth and maturity of crops, and increases production and income. The $CO_2$ capture agent of the disclosure can be used for both facility crops and field crops, and the CO2 capture agent under normal temperature and pressure has wide application.

10 Claims, No Drawings

METHOD FOR PREPARING NANO CARBON DIOXIDE CAPTURE AGENT AND APPLICATION OF SAME

CROSS REFERENCE TO RELATED APPLICATION

This patent application claims the benefit and priority of Chinese Patent Application No. 202110353047.6 filed on Apr. 1, 2021, the disclosure of which is incorporated by reference herein in its entirety as part of the present application.

TECHNICAL FIELD

The present disclosure relates to a carbon dioxide capture agent, and more specifically, to a method for preparing a nano carbon dioxide capture agent and an application of the agent in plant photosynthesis, belonging to the field of carbon dioxide capture agents.

BACKGROUND ART

Global warming has become one of the most serious problems in the world, and the large emission of greenhouse gases is the main cause of global warming, and greenhouse gases mainly include carbon dioxide ($CO_2$), methane ($CH_4$), nitrous oxide ($N_2O$) and other gases, and carbon dioxide has the largest contribution to the greenhouse effect and the largest emission, therefore, reducing carbon dioxide emissions is the key to slowing down global warming, so capturing and storing $CO_2$ is of great significance, on the other hand, $CO_2$ is a potential chemical resource, so how to efficiently and economically recover $CO_2$ is of great economic and social significance.

At present, there are absorption method and membrane separation method for capturing carbon dioxide; the adsorption method has the characteristics of wide application conditions, low cost, low energy consumption, low corrosion and so on, in the adsorption process, the main adsorption materials for carbon dioxide adsorption are divided into non-carbonaceous adsorbents and carbonaceous adsorbents.

Non-carbonaceous adsorbents include zeolite and Shi Ying, which have the advantages of low price, but the disadvantages of easy moisture absorption, high regeneration energy consumption and poor adsorption performance; metal-organic framework MOFs has the advantages of easy control of pore size, high cost and unsuitable for high-temperature use, and alkali metal-based materials such as k, Na and the like, its advantages are that it can absorb carbon dioxide in humid environment, while its disadvantages are poor adsorption performance, high desorption energy consumption, and metal oxide carbonate materials such as CaO and MgO, its advantages are adsorbent before combustion, but its disadvantages are that it needs to be continuously added.

The carbonaceous adsorbent includes ordered porous carbon, which has the advantages of high chemical stability, easy modification of pore size and surface, uniform pore size distribution, poor selectivity, activated carbon fiber ACFs, nano-structured carbon and many micro-pores, however, the activated carbon is only used to treat granular and powder materials, and has unique advantages of water resistance, stability and easy regeneration, and its disadvantages are limited adsorption capacity and large particle size.

Neither non-carbonaceous adsorbent nor carbonaceous adsorbent can be directly used on plant leaves; in addition, liquid amine and alcohol amine solutions are currently used to directly absorb carbon dioxide, this method has high adsorption capacity, good selectivity and high efficiency, but it still has some inherent disadvantages such as high cost, difficult recovery for corrosion equipment, easy volatilization and poor circulation performance.

SUMMARY

To solve at least one of the above technical problems, the present disclosure provides a method for preparing a nano carbon dioxide capture agent and its application in plant photosynthesis.

The technical scheme of the disclosure for solving the technical problems is as follows: a method for preparing a nano carbon dioxide capture agent includes the following steps, step (1), preparing an organic modified mineral soil solution: dissolving a mineral soil and a cationic surfactant in deionized water respectively, adding into a reaction kettle, heating and stirring, and adjusting pH to obtain an organic modified mineral soil solution, wherein the mass ratio of the mineral soil to the cationic surfactant is 3:1-1:1;

step (2), preparing a modified chitosan solution: dissolving a chitosan in an acetic acid, adding the acetic aid into a reaction kettle, stirring and dissolving, dripping a cationic surfactant until the chitosan is completely dissolved, and adjusting pH to obtain the modified chitosan solution, wherein the mass ratio of the chitosan to the cationic surfactant is 9:1-11:1;

step (3), dripping the modified chitosan solution into the organic modified mineral soil solution under a stirring condition, stirring for homogenization and ultrasonically dispersing, adjusting pH value to obtain an organic modified mineral soil loaded modified chitosan solution, filtering, drying and grinding to nanometer level, wherein the mass ratio of the modified chitosan solution to the organic modified mineral soil solution is 0.05-0.1;

step (4), adding a graphene oxide into deionized water, stirring and dispersing to obtain a graphene oxide dispersion;

adding the obtained organic modified mineral soil loaded modified chitosan nano level powder in the step (3) into the graphene oxide dispersion, reacting in a reactor, filtering, drying and grinding to nano level powder; wherein the mass ratio of the organic modified mineral soil loaded modified chitosan nano powder to the graphene oxide is 8: 1-15:1;

step (5), dispersing a hydrotalcite in deionized water for full dissolution, adding the nano powder prepared in the step (4) slowly, adjusting pH until a precipitation of the mixed solution occurs, and uniformly dispersing by magnetic stirring to obtain a nano carbon dioxide capture agent, wherein the mass ratio of the nano powder to the hydrotalcite is 2:1-4:1.

The beneficial effects of the present disclosure are: the method takes cationic surfactant modified bentonite as a carrier, and the $CO_2$ nano agent prepared by loading cationic surfactant modified chitosan, graphene oxide and organic alkali modified hydrotalcite has the photocatalytic effect of nano materials, which can enhance photosynthesis, increase photosynthetic rate, inhibit light respiration at night, synthesize chlorophyll for crop growth, accumulate three essential elements of carbon, hydrogen and oxygen for crop growth, effectively absorb, synthesize and transform organic components such as nitrogen, phosphorus and potassium in soil, fully promote the gestation, growth and maturity of crops, and increases production and income; the $CO_2$ capture agent of the disclosure can be used for both facility crops and field crops, and the $CO_2$ capture agent under normal temperature and pressure has wide application.

On the basis of the above technical scheme, the present disclosure can be further improved as follows.

The present disclosure relates to a method for preparing a nano carbon dioxide capture agent as described above, and further, the cationic surfactant is one or more than two of dodecyl trimethyl ammonium bromide (DTAB), polydimethyldiallyl ammonium chloride (PDMDAAC), dodecyl dimethyl benzyl ammonium chloride, cetyl trimethyl ammonium chloride (CTAC), cetyl trimethyl ammonium bromide (CTAB), tetradecyl trimethyl ammonium bromide, octadecyl trimethyl ammonium bromide (CTMAB) and octadecyl trimethyl ammonium chloride (OTAC).

The present disclosure relates to a method for preparing a nano carbon dioxide capture agent as described above, and further, the pH regulator for adjusting pH in the step (1) to (3) is an organic amine or an organic alcohol amine, and the pH is 7.5-8.3; in the step (5), $K_2CO_3$ or KOH is adopted for pH adjustment, and the pH is 8.5-9.5; preferably, the pH regulator for adjusting pH in the step (1) to (3) is an organic amine or an organic alcohol amine with pH of 8, and the pH regulator in step (5) is $K_2CO_3$ or KOH with pH of 9.

The organic amine and the organic alcohol amine adopted in this disclosure have the functions of adjusting and stabilizing pH value, promoting dispersion of pigment and filler, improving the solubility of resin and the like; and their structural characteristics are that both molecules have amino groups and hydroxyl groups, lone pair exists, they can receive protons from water, they are alkaline, they belong to medium-strong base, and at the same time, they exist hydrogen bonds, can be dissolved in water, and have a surface active function; organic amines and organic alcohol amines have strong affinity for acid gases, and amine groups become the main active sites for $CO_2$ adsorption, the adsorption mechanism is as follows:

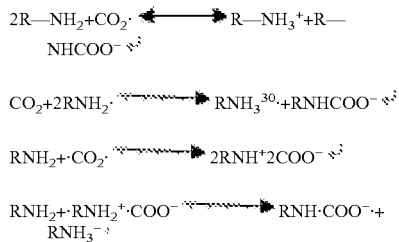

According to the disclosure, modified mineral soil, modified chitosan and graphene oxide are used as carriers of organic amine and organic alcohol amine, and the adsorbability is mainly determined by the structure and surface chemical groups; after the mineral soil, chitosan and graphene oxide are modified by the organic amine and the organic alcohol amine, the type and quantity of surface alkaline functional groups have a significant influence on the adsorption of acid gas carbon dioxide; and the adsorption capacity of $CO_2$ gas is obviously enhanced by preparing composite materials by loading organic amine or organic alcohol amine substances.

The present disclosure relates to a method for preparing a nano carbon dioxide capture agent as described above, and further, the organic amine or the organic alcohol amine is one or more than two of diethylenetriamine (DETA), triethylenetetramine (TETA), tetraethylene pentamine (TEPA), pentaethylene hexamine (PEHA), n-methyl-1, 3-diaminopropane (MAPA) and n, n-. 4-pyridine methylamine, N'-(pyridine-4-ylmethyl) ethane-1,2-diamine, AMP-95, ethanolamine (MEA), diethanolamine (DEA), triethanolamine (TEA), tertiary amine N-methyl glycol amine (MDEA), N, N-diethylethanolamine (DEEA) and N-ethylethanolamine.

The natural mineral soil adopted in the disclosure has unique shell structure, strong adsorption, large specific surface area, high porosity and other excellent properties, which determines that it is a unique carrier material and is widely used in the fields of agriculture and environmental protection; the minerals are mainly some water-bearing aluminosilicate minerals, and their crystal structure is a layered structure in which $(Si_2O_5)$ N layer composed of $[SiO_4]$ tetrahedron and a layer of $AlO(OH)_2$ layer composed of aluminum-oxygen octahedron are connected with each other at vertex angles, which has a sandwich structure, and also has the advantages of excellent adsorption, high adsorption efficiency, simple adsorption condition, simple regeneration and the like, and has excellent water absorption performance and high volume expansion factor after water absorption.

However, because of its relatively small specific surface area and hydrophilicity, and its adsorption will disappear at high temperature, it needs to be modified, that is, inorganic substances or polymers are inserted into its interlayer by virtue of its expansibility and ion exchange, so that it has unique polarity, unique pore size distribution and higher specific surface area, thus improving its activity, after modification, the interlayer spacing and pore volume of montmorillonite are increased, and the exchangeable ions and structural water between natural mineral soil layers are replaced by the organic functional groups in the cationic surfactant, which can not only introduce a large number of hydrophobic functional groups into the structure between natural mineral soil layers to enhance the adsorption of hydrophobic substances, but also increase the spacing between natural mineral soil layers, thus improving the adsorption performance of natural mineral soil, and long-chain quaternary ammonium salts can be successfully loaded on the surface of natural mineral soil, so that the adsorption capacity of natural mineral soil is effectively improved.

According to the disclosure, after the mineral soil is modified by organic amine, alcohol amine and cationic surfactant, the gas-solid contact area of absorption reaction is enlarged, which is beneficial to $CO_2$ removal through absorption reaction, and the adsorption capacity of $CO_2$ gas is obviously enhanced; and the modified materials such as the organic amine, alcohol amine and cationic surfactant have good stability in cyclic use, excellent $CO_2$ adsorption performance and low preparation cost; at the same time, the patent of the present disclosure mainly uses mineral soil as binder (which is easy to attach to plant leaves) and has good adhesive force; in addition, its sandwich structure adsorbs $CO_2$ in mineral soil to realize slow release of $CO_2$.

The present disclosure relates to a method for preparing a nano carbon dioxide capture agent as described above, and further, the step (5) is prepared by hydrotalcite coprecipitation method, includes: mixing and dispersing $Na_2CO_3$, $K_2CO_3$, $Mg(NO_3)_2 \cdot 6H_2O$ and $Al(NO_3)_3 \cdot 9H_2O$ uniformly at a ratio of 3.5:0.5:0.5:1.2:1.0, and dissolving at a ratio of 100 g/L in deionized water; in the step (5), $K_2CO_3$ or KOH is adopted for pH adjustment.

The present disclosure relates to a method for preparing a nano carbon dioxide capture agent as described above, and further, the mineral soil is one or more than two of rare earth, diatomite, attapulgite, bentonite, kaolin or montmorillonite, and the fineness reaches nanometer level; the mineral soil and the cationic surfactant are respectively dissolved in deionized water with a concentration of 12 g/l; in the reaction kettle, the stirring speed is 500 r/min, and the temperature is 70° C., and the mixture is heated and stirred for 2 h.

The present disclosure relates to a method for preparing a nano carbon dioxide capture agent as described above, and further, in step (2), wherein the mass concentration of acetic acid is 3-8%, and the mass concentration of chitosan dissolved in acetic acid is 50-200 g/l; the stirring speed in the reaction kettle is 400-600 r/min, and the reaction kettle is heated and stirred at 50-80° C. for complete dissolution. More preferably, the mass concentration of acetic acid is 5%, and the mass concentration of chitosan dissolved in acetic acid is 100 g/l; the stirring speed in the reaction kettle is 500 r/min, and the reaction kettle is heated and stirred at 60° C. to completely dissolve.

The present disclosure relates to a method for preparing a nano carbon dioxide capture agent as described above, and further, in step (3), dripping the modified chitosan solution into the organic modified mineral soil solution at a stirring speed of 400-600 r/min and a temperature of 50-80° C., stirring for 2 hours, then introducing into a homogenizer, and uniformly dispersing for 6-15 hours at a rotating speed of 12,000-16,000 r/min, adjusting pH to 7.5-8.2 to obtain an organic modified mineral soil loaded modified chitosan solution, filtering, drying at 80-120° C. for 1-2 h, and introducing into a nano grinder for grinding to nanometer level; More preferably, the modified chitosan solution is dripped into the organic modified mineral soil solution at a stirring speed of 500 r/min and a temperature of 70° C., stirred for 2 h, introduced into a homogenizer, uniformly dispersed for 10 min at a rotating speed of 15,000 r/min, introduced into an ultrasonic wave for dispersion for 5 min, and adjusted to pH 8 to obtain an organic modified mineral soil loaded modified chitosan solution, which is filtered, dried at 100° C. for 1 h, and introduced into a nano grinder for grinding.

Chitosan is a kind of natural high molecular organic compound, which is a product after N-acetyl removal of chitin in an alkaline environment, that is, β-(1,4)-2-amino-2-deoxy-D-glucose, and chitosan is insoluble in water and alkali liquor, but soluble in dilute hydrochloric acid, nitric acid and most organic acids (such as acetic acid), since chitosan is rich iN-$NH_2$, —OH and n-acetyl, so it can produce a lot of chemical reactions, has a good adsorption effect, is a chelating adsorbent with a good adsorption effect, the functional groups in the chitosan molecules are a large number of hydroxyl groups, can be combined with the carrier material through ionic bonds, hydrogen bonds and van der waals forces, and the amino functionalized organic mineral soil composite material can graft organic groups such as oxygen-containing groups and amino groups onto the surface of the mineral soil to increase the adsorption performance of the mineral soil.

The modified chitosan has excellent adsorption capacity for graphene oxide (GO), which is a new type of carbonaceous adsorption material. It has large specific surface area and rich functional groups on the surface of carbon skeleton structure, and is easy to be modified by other functional groups, however, its hydrophilicity makes it difficult to separate from aqueous solution, and GO, as a nano-material, is prone to agglomeration, causing it to lose part of its specific surface area, so as to order to improve the stability of modified chitosan (CS), it is difficult to inhibit graphene oxide (GO).

The disclosure is compounded with natural minerals, and based on the fact that natural mineral soil has defects such as high expansibility, dispersion and suspension due to the hydrophilicity of surface Si-0 and hydrolysis of a large number of exchangeable cations between layers, chitosan is the only alkaline polysaccharide existing in nature, and compounding with bentonite is beneficial to overcome the defects such as high expansibility, dispersion and suspension; chitosan molecules contain a lot of amino groups, which are positively charged when dissolved in acidic solution. Tetrahedron and octahedron of mineral soil have extensive isomorphic replacement, and $Si^{4+}$ in tetrahedron is often replaced by $Al^{3+}$, while $Al^{3+}$ in octahedron is often replaced by $Mg^{2+}$, $Fe^{3+}$, $Fe^{2+}$, $Ni^{2+}$, $Li^+$ and the like, which causes a weak negative charge between the layers, thereby having the ability to adsorb some cations, and mineral soils and chitosan can be held together by the attraction of positive and negative charges.

The present disclosure relates to a method for preparing a nano carbon dioxide capture agent as described above, and further, in the step (4), wherein the mass concentration of the graphene oxide dispersed into deionized water in the step (4) is 1-2 g/L, and ultrasonic dispersion is performed for 1.5-2.5 h; in the microwave reactor, the microwave power is 800-1000 W power, and the microwave radiation time is 15-25 min; wherein the mass concentration of the graphene oxide dispersed into the deionized water is 1.5 g/L, and the ultrasonic dispersion is performed for 2 hours; in the microwave reactor, the microwave power is 900 W power, and the microwave radiation time is 20 min; the drying is 100° C. for 1 h; and the grinding nano grinder is ground for 1 h.

The present disclosure relates to a method for preparing a nano carbon dioxide capture agent as described above, and further, the method includes a powder preparation step: transferring the nano carbon dioxide capture agent mixed solution obtained in the step (5) into a reaction kettle with a jacket, performing hydrothermal reaction at 110° C. for 36 h, fully washing with absolute ethyl alcohol and deionized water, performing suction filtration, performing freeze drying, and introducing the nano-grinder to grind for 2 h to obtain a powdery nano composite product. More preferably, the hydrothermal reaction is performed for 30-40 h at 100-120° C. for 1-2 h.

The disclosure utilizes the compound synergistic principle, the hydrotalcite material adopted is an anion type layered compound with the layered structure and the exchangeability of interlayer ions, and has the advantages of high adsorption selectivity, strong stability, low cost, convenient storage and transportation and the like when being used as an adsorbent for absorbing carbon dioxide, by utilizing the intercalation property of a layered compound main body and the exchangeability of interlayer ion under the action of strong polar molecules, some functional guest substances (bentonite-loaded chitosan and graphene) are introduced into the interlayer gap and the distance of the layered plate is opened so that the hydrotalcite forming the layered column compound has stronger adsorption performance, and a good $CO_2$ adsorbent should have a large specific surface area and pore volume, a rich ultra-microporous structure and appropriate heteroatom dope, and that introduction of hydrotalcite, chitosan and mineral soil into the carbon material can generate more active sites favorable for $CO_2$ capture, increase the interaction between the material and $CO_2$, and thus improve the adsorption amount of $CO_2$.

Graphene oxide has a large specific surface area, various structures, adjustable pore size and metal coordination groups, and can be used as adsorbents to have better adsorption performance, because its adsorption groups are mainly carboxyl groups and hydroxyl groups, and the adsorption capacity is limited, thus, the adsorption capacity can be increased by attaching some functional groups. The molecular structure of chitosan contains amino group and hydroxyl group, which has the advantages of good adsorption, easy regeneration and low cost. The composite adsorbent is prepared by grafting chitosan onto the graphene oxide, and the composite material combines the characteristics of the two materials, has good mechanical property, is insoluble in acid, is modified by a cationic surfactant, and has multiple adsorption sites, so that the composite material shows good $CO_2$ gas adsorption performance; the organic modified mineral soil is obtained by modifying the mineral soil with a cationic surfactant, and the GO/organic modified mineral soil composite material is obtained by mixing the GO serving as a reinforcing agent and the organic modified mineral soil, and the appearance structure is changed after the GO/organic modified mineral soil composite material is compounded, so that the specific surface area of the material is increased;

Selecting $Mg(NO_3)_2 \cdot 6H_2O$ to prepare hydrotalcite is an important factor for solid adsorbent, and both the amount of precursor and the strength need to be considered. As for the adsorption capacity, on the premise that the content of Mg in the hydrotalcite is hydrotalcite crystal, the higher the content of Mg is in favor of $CO_2$ adsorption, and the water vapor contained in the water-gas shift can also enhance the adsorption, on the other hand, when the hydrotalcite operates continuously for a long time, the adsorption amount is sure to decrease along with the cycle times, and the adsorbent with relatively stable adsorption amount should be selected.

The nano hydrotalcite is prepared by an improved well-known coprecipitation method, wherein $K_2CO_3$ is mainly used for replacing a part of $N_2CO_3$, and $K_2CO_3$ or KOH solution is used for replacing NaOH solution in alkali liquor for adjusting the pH value, the hydrotalcite is a layered structure composed of composite magnesium-aluminum hydroxide and interlayer anions, the magnesium atom in the center of the magnesium oxide octahedral cell is partially replaced by aluminum atoms, and the laminate has positive charges due to the doping of aluminum atoms, anions, such as carbonate, enter the interlayer to balance the charge and form the molecular structure of hydrotalcite together with some interlayer water, after modifying potassium carbonate, the Mg(Al)—OK alkaline adsorption site has higher adsorption capacity and faster adsorption rate, and the addition of appropriate amount of $K_2CO_3$ or KOH effectively improves the pore radius and specific surface area of hydrotalcite adsorbent, thus effectively improving the adsorption rate and adsorption capacity, with the continuous increase of potassium carbonate addition, the pore canal of hydrotalcite adsorbent was filled with excessive potassium carbonate, and the pore canal radius and specific surface area decreased to a certain extent, and the subsequent adsorption capacity remained basically unchanged because the adsorbent's ability to absorb potassium carbonate was saturated, and the pore canal radius and specific surface area remained basically unchanged;

Graphene oxide (carbon nanomaterials) can take on many different forms, and they have various properties and are widely used in many fields such as filtration and adsorption, and carbon nanomaterials can be synthesized in batches and has hierarchical porous structure (including both macropores and micropores), and macropores provide low resistance channels and high specific surface area for target gases to reach micropores, therefore, $CO_2$ capture is of great significance, at the same time, the adsorption performance of pure carbon nanomaterials can be improved by surface functional modification, although carbon nanomaterials may be denser and more expensive than other carbon materials, they can accurately produce the best $CO_2$ capture materials with high selectivity and high capacity. So carbon nanostructures have high $CO_2$ capture capacity, high thermal stability and good reproducibility; hydrotalcite has special layered structure and unique physical properties, and has the catalytic performance of shape-selective adsorption with adjustable pore size, which occupies a very important position in the field of catalytic adsorption, and graphene oxide has a large surface area and strong absorbability, but untreated graphene has strong π-π interaction, small particle size and easy agglomeration, which limits its application, and hydrotalcite has special physical properties and layered structure, according to the disclosure, the pore size structure and roughness of the hydrotalcite are compounded and the relative surface area of the hydrotalcite is improved by adopting a method that graphene oxide supports cationic surfactant modified mineral soil and chitosan to compound the hydrotalcite, so that the adsorption performance of the hydrotalcite is enhanced, and the $CO_2$ trapping capacity of functionalized graphene at normal temperature and pressure is 4.3 mmol/g;

As $CO_2$ is an acidic gas, the efficiency of $CO_2$ capture by acidic system is low. According to the disclosure, the interactions among graphene oxide, organic modified mineral soil, modified chitosan, hydrotalcite and $CO_2$ include hydrogen bonding, dipole interaction and covalent interaction, and can be enhanced by introducing surface alkaline groups. Graphene oxide, mineral soil, chitosan, hydrotalcite and $CO_2$ can act as Lewis bases and absorb protons from solvents. Introducing alcohol amine on the surfaces of graphene oxide, mineral soil, chitosan and hydrotalcite will increase the alkalinity of materials, thus enhancing their $CO_2$ absorption capacity. Graphene oxide, mineral soil, chitosan and hydrotalcite usually have interconnected pore structures, high specific surface areas, stable physical and chemical properties, and are widely used in catalysis, purification and adsorption separation. The interaction between single materials and carbon dioxide is relatively weak, so they are sensitive to temperature and pressure, and their adsorption capacity and selective adsorption to carbon dioxide are relatively low at low pressure. The modified chitosan, graphene oxide and hydrotalcite supported by alkali-modified mineral soil are used to improve the specific surface area and pore structure of the adsorption material, and the alkalinity is enhanced by surface chemical modification, and amino groups are introduced to generate more active sites which are beneficial to $CO_2$ capture, thus increasing the interaction between the material and $CO_2$, and having great adsorption performance for $CO_2$ at normal pressure and temperature.

The method for preparing the nano carbon dioxide capture agent provided by the disclosure is used as a plant synergistic fertilizer or applied in a plant synergistic fertilizer.

DETAILED DESCRIPTION OF THE EMBODIMENTS

The principles and features of the present disclosure are described below in connection with the following embodiments, which are given to illustrate the disclosure and are not intended to limit the scope of the disclosure.

Embodiment 1

Method for Preparing a Nano Carbon Dioxide Capture Agent:

Step 1: dissolving in deionized water with a mass/volume ratio of 11 g/L according to a ratio of m (diatomite):m (dodecyl trimethyl ammonium bromide (DTAB))=3:1 respectively, adding into a reaction kettle with a heating jacket, heating and stirring at 80° C. for 1 h at a rotating speed of 600 r/min, and adjusting pH value to 8 with ethanolamine (MEA) to obtain dodecyl trimethyl ammonium bromide (DTAB) modified organic diatomite;

Step 2: dissolving a chitosan in an acetic acid (concentration: 5%) according to a certain proportion (mass/volume ratio: 100 g/L), adding into a reaction kettle with a heating jacket, at a rotating speed of 500 r/min, and heating and stirring at 60° C. for complete dissolution; according to the ratio of m (chitosan):m (dodecyl trimethyl ammonium bromide (DTAB)=9:1, at a rotating speed of 450 r/min, heating and stirring at 70° C. for 1 hour for complete dissolution, dripping an ethanolamine (MEA) until complete dissolution, and adjusting pH value to 8 with an ethanolamine (MEA) to obtain a dodecyl trimethyl ammonium bromide (DTAB) modified chitosan solution;

Step 3: according to the ratio of m (dodecyl trimethyl ammonium bromide (DTAB) modified chitosan solution):m (dodecyl trimethyl ammonium bromide (DTAB) modified diatomite solution) of 0.05:1, dripping the solution prepared in the second step into the solution prepared in the first step at the rotating speed of 500 r/min and the temperature of 70° C., stirring for 2 h, introducing into a homogenize, homogenizing and dispersing for 10 min at the rotating speed of 12000 r/min, introducing an ultrasonic dispersion for 5 min, using ethanolamine (MEA) to adjust pH value to 8 to obtain a dodecyl trimethyl ammonium bromide (DTAB) modified organic diatomite loaded dodecyl trimethyl ammonium bromide (DTAB) modified chitosan solution, performing suction filtration, drying at 100° C. for 1 h, introducing into a nano-grinder for grinding for 2 hours, and distributing the particle size distribution to nanoscale;

Step 4: filling the graphene oxide into a dispersion tank of distilled water according to a ratio (1.5 g/L), performing an ultrasonic dispersion for 2 hours to uniformly disperse, adding the powder with a ration of m (dodecyl trimethyl ammonium bromide (DTAB) modified organic diatomite loaded dodecyl trimethyl ammonium bromide (DTAB) modified chitosan solution:m (graphene oxide)=8:1 into the graphene oxide dispersion liquid, under the power of 900 w, microwave radiation for 20 min, adjusting pH value to 8 by using ethanolamine (MEA), suction filtering, drying at 100° C. for 1 h, introducing into a nano-grinder for grin for 1 h, a dodecyltrimethylammonium bromide (DTAB) modified organic diatomaceous earth loaded dodecyltrimethylammonium bromide (DTAB) modified chitosan and a graphene oxide powder were obtained.

Step 5: preparing a nano hydrotalcite by an improved known coprecipitation method, uniformly mixing and dispersing according to a ration of m ($Na_2CO_3$):m ($K_2CO_3$):m ($Mg(NO_3)_2 \cdot 6H_2O$):m ($Al(NO_3)_3 \cdot 9H_2O$)=3.5:0.5:1.2:1.0, dissolving in deionized water in a ratio of (100 g/L) at a rotating speed of 1000 r/min, and stirring for 2 hours to fully dissolve, slowly adding (m (dodecyl trimethyl ammonium bromide (DTAB) modified organic diatomite supported dodecyl trimethyl ammonium bromide (DTAB) modified chitosan, graphene oxide powder:m (hydrotalcite)) in a ratio of 2:1, then slowly dripping $K_2CO_3$ or KOH to adjust the pH to 9, and the mixed solution will appear to precipitate (pH=9.0), finally, continuously magnetically stirring for 2 h, introducing a homogenizer, and dispersing for 10 min at a rotation speed of 15000 r/min, and introducing ultrasonic dispersion for 5 min to obtain a uniformly dispersed nano mixed solution product; further, transferring the mixed solution to a jacketed reaction kettle, and the liquid product was obtained after hydrothermal reaction at 110° C. for 36 hours. Further, fully washing with absolute ethanol and deionized water, filtering with suction, freeze drying, and introducing into a nano-grinder for grinding for 2 h to obtain a powder nano-composite material product.

Embodiment 2

Method for Preparing a Nano Carbon Dioxide Capture Agent:

Step 1: dissolving in deionized water (mass/volume ratio: 14 g/L) according to a ratio of m (kaolin):m (octadecyl trimethyl ammonium bromide (CTMAB))=1:1:1 respectively, adding into a reaction kettle with a heating jacket, heating and stirring at 70° C. for 2 h at a rotating speed of 500 r/min, and adjusting pH value to 8 with diethanolamine (DEA) to obtain an octadecyl trimethyl ammonium bromide (CTMAB) modified organic kaolin;

Step 2: dissolving a chitosan in an acetic acid (concentration: 5%) according to a certain proportion (mass/volume ratio: 100 g/L), adding into a reaction kettle with a heating jacket, at a rotating speed of 500 r/min, and heating and stirring at 70° C. for complete dissolution; according to the ratio of m (chitosan):m (octadecyl trimethyl ammonium bromide (CTMAB))=11:1, at a rotating speed of 500 r/min, heating and stirring at 60° C. for complete dissolution, dripping an ethanolamine (MEA) until complete dissolution, and adjusting pH value to 8 with diethanolamine (DEA) to obtain a octadecyl trimethyl ammonium bromide (CTMAB) modified chitosan;

Step 3: according to the ratio of m (octadecyl trimethyl ammonium bromide (CTMAB) modified chitosan):m (octadecyl trimethyl ammonium bromide (CTMAB) modified organic kaolin) of 0.05:1, dripping the solution prepared in the step 2 into the solution prepared in the first step at the rotating speed of 500 r/min and the temperature of 70° C., stirring for 2 h, introducing into a homogenize, homogenizing and dispersing for 10 min at the rotating speed of 12000 r/min, introducing an ultrasonic dispersion for 5 min, using a diethanolamine (DEA) to adjust pH value to 8 to obtain a octadecyl trimethyl ammonium bromide (CTMAB) modified organic kaolin loaded octadecyl trimethyl ammonium bromide (CTMAB) modified chitosan solution, performing suction filtration, drying at 100° C. for 1 h, introducing into a nano-grinder for grinding for 2 hours, and distributing the particle size distribution to nanoscale;

Step 4: dispersing the graphene oxide with distilled water according to a ratio (1.5 g/L), performing an ultrasonic dispersion for 2 h to uniformly disperse, adding the powder with a ration of m (octadecyl trimethyl ammonium bromide (CTMAB) modified organic diatomite loaded octadecyl trimethyl ammonium bromide (CTMAB) modified chitosan solution:m (graphene oxide)=8:1 into the graphene oxide dispersion liquid, under the power of 900 w, microwave radiation for 20 min, adjusting pH value to 8 by using diethanolamine (DEA), suction filtering, drying at 100° C. for 1 h, introducing into a nano-grinder for grin for 1 h, a octadecyl trimethyl ammonium bromide (CTMAB) modified organic diatomaceous earth loaded octadecyl trimethyl ammonium bromide (CTMAB) modified chitosan and a graphene oxide powder were obtained.

Step 5: preparing a nano hydrotalcite by an improved known coprecipitation method, uniformly mixing and dispersing according to a ration of m ($Na_2CO_3$):m ($K_2CO_3$):m ($Mg(NO_3)_2 \cdot 6H_2O$):m ($Al(NO_3)_3 \cdot 9H_2O$)=3.5:0.5:1.2:1.0, dissolving in deionized water in a ratio of (100 g/L) at a rotating speed of 1000 r/min, and stirring for 2 h to fully dissolve, slowly adding (m octadecyl trimethyl ammonium bromide (CTMAB) modified organic diatomite supported Octadecyl trimethyl ammonium bromide (CTMAB) modified chitosan, graphene oxide powder:m (hydrotalcite)) in a ratio of 1:2.5, then slowly dripping $K_2CO_3$ or KOH to adjust the pH to 9, and the mixed solution will appear to precipitate (pH=9.0), finally, continuously magnetically stirring for 2 h, introducing a homogenizer, and dispersing for 10 min at a rotation speed of 15000 r/min, and introducing ultrasonic dispersion for 5 min to obtain a uniformly dispersed nano mixed solution product; further, transferring the mixed solution to a jacketed reaction kettle, and the liquid product was obtained after hydrothermal reaction at 110° C. for 36 h. Further, fully washing with absolute ethanol and deionized water, filtering with suction, freeze drying, and introducing into a nano-grinder for grinding for 2 h to obtain a powder nano-composite material product.

Embodiment 3

Method for Preparing a Nano Carbon Dioxide Capture Agent:

Step 1: dissolving in deionized water (mass/volume ratio: 12 g/L) according to a ratio of m(bentonite):m(cetyl trimethyl ammonium bromide (CTAB))=2:1 respectively, adding into a reaction kettle with a heating jacket, heating and stirring at 70° C. for 2 h at a rotating speed of 500 r/min, and adjusting pH value to 8 with tetraethylenepentaamine (TEPA) to obtain cetyl trimethyl ammonium bromide (CTAB) modified organobentonite;

Step 2: dissolving a chitosan in an acetic acid (concentration: 5%) according to a certain proportion (mass/volume ratio: 100 g/L), adding into a reaction kettle with a heating jacket, at a rotating speed of 500 r/min, and heating and stirring at 70° C. for complete dissolution; according to the ratio of m (chitosan):m (cetyl trimethyl ammonium bromide (CTAB))=10:1, at a rotating speed of 500 r/min, heating and stirring at 60° C. for complete dissolution, dripping an cetyl trimethyl ammonium bromide (CTAB) until complete dissolution, and adjusting pH value to 8 with tetraethylene pentamine (TEPA) to obtain a cetyl trimethyl ammonium bromide (CTAB) modified chitosan;

Step 3: according to the ratio of m (modified chitosan):m (modified organic bentonite) of 0.1, dripping the solution prepared in the step 2 into the solution prepared in the first step at the rotating speed of 500 r/min and the temperature of 70° C., stirring for 2 h, introducing into a homogenize, homogenizing and dispersing for 10 min at the rotating speed of 15000 r/min, introducing an ultrasonic dispersion for 10 min, using a tetraethylene pentamine (TEPA) to adjust pH value to 8 to obtain a cetyl trimethyl ammonium bromide (CTAB) modified organic bentonite loaded modified chitosan solution, performing suction filtration, drying at 100° C. for 1 h, introducing into a nano-grinder for grinding for 2 h, and distributing the particle size distribution to nanoscale;

Step 4: dispersing the graphene oxide with distilled water according to a ratio (1.5 g/L), performing an ultrasonic dispersion for 2 h to uniformly disperse, adding the powder with a ration of m (modified organobentonite load modified chitosan):m (graphene oxide)=11:1 into the graphene oxide dispersion liquid, under the power of 900 w, microwave radiation for 20 min, adjusting pH value to 8 by using tetraethylene pentamine (TEPA), suction filtering, drying at 100° C. for 1 h, introducing into a nano-grinder for grin for 1 h, a modified organic bentonite load modified chitosan and a graphene oxide powder were obtained.

Step 5: preparing a nano hydrotalcite by an improved known coprecipitation method, uniformly mixing and dispersing according to a ration of m ($Na_2CO_3$):m ($K_2CO_3$):m ($Mg(NO_3)_2 \cdot 6H_2O$):m ($Al(NO_3)_3 \cdot 9H_2O$)=3.5:0.5:1.2:1.0, dissolving in deionized water in a ratio of (100 g/L) at a rotating speed of 1000 r/min, and stirring for 2 h to fully dissolve, slowly adding (m (modified organobentonite loaded modified chitosan, graphene oxide powder:m(hydrotalcite))=3:1, then slowly dripping $K_2CO_3$ or KOH to adjust the pH to 9, and the mixed solution will appear to precipitate (pH=9.0), finally, continuously magnetically stirring for 2 h, introducing a homogenizer, and dispersing for 10 min at a rotation speed of 15000 r/min, and introducing ultrasonic dispersion for 5 min to obtain a uniformly dispersed nano mixed solution product; further, transferring the mixed solution to a jacketed reaction kettle, and the liquid product was obtained after hydrothermal reaction at 110° C. for 36 h. Further, fully washing with absolute ethanol and deionized water, filtering with suction, freeze drying, and introducing into a nano-grinder for grinding for 2 h to obtain a powder nano-composite material product.

Embodiment 4

Method for preparing a nano carbon dioxide capture agent:

Step 1: dissolving in deionized water (mass/volume ratio: 12 g/L) according to a ratio of m (attapulgite):m (cetyltrimethylammonium chloride (CTAC))=1.5:1 respectively, adding into a reaction kettle with a heating jacket, heating and stirring at 70° C. for 2 h at a rotating speed of 500 r/min, and adjusting pH value to 8 with triethanolamine (TEA) to obtain hexadecyl trimethyl ammonium chloride (CTAC) modified organic attapulgite;

Step 2: dissolving a chitosan in an acetic acid (concentration: 5%) according to a certain proportion (mass/volume ratio: 100 g/L), adding into a reaction kettle with a heating jacket, at a rotating speed of 500 r/min, and heating and stirring at 60° C. for complete dissolution; according to the ratio of m (chitosan):m (cetyl trimethyl ammonium chloride (CTAC))=9.5:1, at a rotating speed of 500 r/min, heating and stirring at 60° C. for complete dissolution, dripping an cetyl trimethyl ammonium chloride (CTAC) until complete dissolution, and adjusting pH value to 8 with triethanolamine (TEA) to obtain a cetyl trimethyl ammonium chloride (CTAC) modified chitosan;

Step 3: according to the ratio of m (modified chitosan):m (modified organic attapulgite)=0.09:1, dripping the solution prepared in the step 2 into the solution prepared in the step 1 at the rotating speed of 500 r/min and the temperature of 70° C., stirring for 2 h, introducing into a homogenize, homogenizing and dispersing for 10 min at the rotating speed of 15000 r/min, introducing an ultrasonic dispersion for 5 min, using a triethanolamine (TEA) to adjust pH value to 8 to obtain a modified organic attapulgite load modified chitosan solution, performing a suction filtration, drying at 100° C. for 1 h, introducing into a nano-grinder for grinding for 2 h, and distributing the particle size distribution to nanoscale;

Step 4: dispersing the graphene oxide with distilled water according to a ratio (1.5 g/L), performing an ultrasonic dispersion for 2 h to uniformly disperse, adding the powder with a ration of m (modified organic attapulgite loaded modified chitosan):m (graphene oxide)=15:1 into the graphene oxide dispersion liquid, under the power of 900 w, microwave radiation for 20 min, adjusting pH value to 8 by using tetraethylene pentamine (TEPA), suction filtering, drying at 100° C. for 1 h, introducing into a nano-grinder for grin for 1 h, a modified organic attapulgite loaded modified chitosan and a graphene oxide powder were obtained.

Step 5: preparing a nano hydrotalcite by an improved known coprecipitation method, uniformly mixing and dispersing according to a ration of m ($Na_2CO_3$):m ($K_2CO_3$):m ($Mg(NO_3)_2 \cdot 6H_2O$):m ($Al(NO_3)_3 \cdot 9H_2O$)=3.5:0.5:1.2:1.0, dissolving in deionized water in a ratio of (100 g/L) at a rotating speed of 1000 r/min, and stirring for 2 h to fully dissolve, slowly adding (m(modified organic attapulgite loaded modified chitosan, graphene oxide powder:m(hydrotalcite))=4:1, then slowly dripping $K_2CO_3$ or KOH to adjust the pH to 9, and the mixed solution will appear to precipitate (pH=9.0), finally, continuously magnetically stirring for 2 h, introducing a homogenizer, and dispersing for 10 min at a rotation speed of 15000 r/min, and introducing ultrasonic dispersion for 5 min to obtain a uniformly dispersed nano mixed solution product; further, transferring the mixed solution to a jacketed reaction kettle, and the liquid product was obtained after hydrothermal reaction at 110° C. for 36 h. Further, fully washing with absolute ethanol and deionized water, filtering with suction, freeze drying, and introducing into a nano-grinder for grinding for 2 h to obtain a powder nano-composite material product.

Embodiment 5

Method for Preparing a Nano Carbon Dioxide Capture Agent:

Step 1: dissolving in deionized water (mass/volume ratio: 12 g/L) according to a ratio of m(rare earth):m (polydimethyldiallylammonium chloride (PDMDAAC))=2.5:1 respectively, adding into a reaction kettle with a heating jacket, heating and stirring at 70° C. for 2 h at a rotating speed of 500 r/min, and adjusting pH value to 8 with diethylenetriamine (DETA) to obtain polydimethyldiallylammonium chloride (PDMDAAC) modified organic rare earth;

Step 2: dissolving a chitosan in an acetic acid (concentration: 5%) according to a certain proportion (mass/volume ratio: 100 g/L), adding into a reaction kettle with a heating jacket, at a rotating speed of 500 r/min, and heating and stirring at 60° C. for complete dissolution; according to the ratio of m (chitosan):m(polydimethyldiallylammonium chloride (PDMDAAC))=10.5:1, at a rotating speed of 500 r/min, heating and stirring at 60° C. for complete dissolution, dripping an polydimethyldiallylammonium chloride (PDMDAAC) until complete dissolution, and adjusting pH value to 8 with diethylene triamine (DETA) to obtain a polydimethyldiallylammonium chloride (PDMDAAC) modified chitosan;

Step 3: according to the ratio of m (modified chitosan):m (modified organic rare earth)=0.08:1, dripping the solution prepared in the step 2 into the solution prepared in the step 1 at the rotating speed of 500 r/min and the temperature of 70° C., stirring for 2 h, introducing into a homogenize, homogenizing and dispersing for 10 min at the rotating speed of 15000 r/min, introducing an ultrasonic dispersion for 5 min, using a diethylene triamine (DETA) to adjust pH value to 8 to obtain a modified organic rare earth load modified chitosan solution, performing a suction filtration, drying at 100° C. for 1 h, introducing into a nano-grinder for grinding for 2 h, and distributing the particle size distribution to nanoscale;

Step 4: dispersing the graphene oxide with distilled water according to a ratio (1.5 g/L), performing an ultrasonic dispersion for 2 h to uniformly disperse, adding the powder with a ration of m (modified organic rare earth loaded modified chitosan):m (graphene oxide)=12:1 into the graphene oxide dispersion liquid, under the power of 900 w, microwave radiation for 20 min, adjusting pH value to 8 by using a diethylene triamine (DETA), suction filtering, drying at 100° C. for 1 h, introducing into a nano-grinder for grin for 1 h, a modified organic rare earth load modified chitosan and a graphene oxide powder were obtained.

Step 5: preparing a nano hydrotalcite by an improved known coprecipitation method, uniformly mixing and dispersing according to a ration of m ($Na_2CO_3$):m ($K_2CO_3$):m ($Mg(NO_3)_2 \cdot 6H_2O$):m ($Al(NO_3)_3 \cdot 9H_2O$)=3.5:0.5:1.2:1.0, dissolving in deionized water in a ratio of (100 g/L) at a rotating speed of 1000 r/min, and stirring for 2 h to fully dissolve, slowly adding (m(modified organic rare earth loaded modified chitosan, graphene oxide powder:m(hydrotalcite))=3.5:1, then slowly dripping $K_2CO_3$ or KOH to adjust the pH to 9, and the mixed solution will appear to precipitate (pH=9.0), finally, continuously magnetically stirring for 2 h, introducing a homogenizer, and dispersing for 10 min at a rotation speed of 15000 r/min, and introducing ultrasonic dispersion for 5 min to obtain a uniformly dispersed nano mixed solution product; further, transferring the mixed solution to a jacketed reaction kettle, and the liquid product was obtained after hydrothermal reaction at 110° C. for 36 h. Further, fully washing with absolute ethanol and deionized water, filtering with suction, freeze drying, and introducing into a nano-grinder for grinding for 2 h to obtain a powder nano-composite material product.

The preparation parameter of embodiments 1 to 5 and the product property such as $CO_2$ capture of the nano carbon dioxide capture agent are shown in table 1 and table 2 below.

TABLE 1 preparation parameters and product properties of embodiments 1 to 5

| Embodiments | Types of cationic surfactants | Type of PH regulator | M organic modified mineral soil: M cationic surfactant | M chitosan:m cationic surfactant | M chitosan:m organic modified mineral soil | M (modified chitosan supported by modified mineral soil):m graphene oxide | M hydrotalcite:m (organic modified mineral soil supported modified chitosan and graphene oxide) | CO2 capture performance mmol/g 0° C. 1 atm | 25° C. 1 atm | 100° C. 1 atm |
|---|---|---|---|---|---|---|---|---|---|---|
| Embodiment 1 | DTAB | MEA | 3:1 (diatomite) | 9:1 | 0.05:1 | 8:1 | 1:2 | 2.7 | 3.1 | 3.9 |
| Embodiment 2 | CTMAB | DEA | 1:1 (kaolin) | 11:1 | 0.06:1 | 9:1 | 1:2.5 | 3.0 | 3.9 | 5.2 |
| Embodiment 3 | CTAB | TEPA | 2:1 (bentonite) | 10:1 | 0.1:1 | 11:1 | 1:3 | 6.2 | 6.6 | 8.9 |
| Embodiment 4 | CTAC | TEA | 1.5:1 (Attapulgite) | 9.5:1 | 0.09:1 | 15:1 | 1:4 | 4.3 | 4.6 | 6.5 |
| Embodiment 5 | PDMDAAC | DETA | 2.5:1 (rare earth) | 10.5:1 | 0.08:1 | 12:1 | 1:3.5 | 3.7 | 4.1 | 5.8 |

Note:
$CO_2$ capture performance, at $CO_2$ flow rate of 6 ml/min

TABLE 2 preparation parameters and powder product properties of embodiments 1 to 5

| Embodiments | Types of cationic surfactants | Type of pH regulator | specific surface area g/m² | mean pore size nm | Total pore volume g/cm3 |
|---|---|---|---|---|---|
| Embodiment 1 | DTAB | MEA | 96.4 | 10.90 | 0.33 |
| Embodiment 2 | CTMAB | DEA | 132.1 | 9.82 | 0.85 |
| Embodiment 3 | CTAB | TEPA | 231.3 | 6.70 | 2.81 |
| Embodiment 4 | CTAC | TEA | 173.9 | 8.19 | 1.09 |
| Embodiment 5 | PDMDAAC | DETA | 111.8 | 13.53 | 0.97 |

Experiment Design

According to the above-mentioned 5 embodiments, the experiment group and one control group (CK group) were set for each of the 3 groups according to the experiment design Experiment 1, five $CO_2$ capture agent application areas and one non-application area were set up in six greenhouses (CK group as control). the experimental area and the control area were planted at the same time, the cucumber in the experimental area was applied with $CO_2$ capture agent from November 26th, and there were five $CO_2$ capture agent application areas in the greenhouse. the greenhouses in embodiments 1 and 2 were directly added with water according to liquid products (liquid products:water=1:30), and the spraying amount per mu of leaves was equivalent to 1 kg. In the greenhouses where Embodiments 3, 4 and 5 are located, according to the volume and mass ratio of powdery products to water (2 g/L), the amount of liquid products is 1 kg per mu. According to the investigation of botanical properties, the observation indexes include the plant height, stem circumference, number and area of functional leaves, weight of single melon and yield of cucumber in applied and non-applied areas. The results are shown in Table 3.

Application results of $CO_2$ capture agents prepared in embodiments 1 to 5.

| Embodiments | Leaf width (cm) | Leaf length (cm) | Stem circumference (cm) | plant height (cm) | Fruit number. (pieces) | Functional leaf number (slice) | Single melon weight (g) | Yield per plant (kg) | Yield per mu (kg) | increase the production % |
|---|---|---|---|---|---|---|---|---|---|---|
| CK | 14.5 | 14.00 | 0.55 | 113.0 | 0.60 | 15.5 | 6.70 | 1.03 | 4654 | / |
| Embodiment 1 | 16.3 | 16.0 | 0.71 | 126.2 | 0.94 | 17.0 | 7.20 | 1.31 | 5653 | 21.5 |
| Embodiment 2 | 16.5 | 16.1 | 0.73 | 132.0 | 1.00 | 16.0 | 7.40 | 1.74 | 5815 | 24.9 |
| Embodiment 3 | 17.5 | 16.5 | 0.80 | 138.0 | 1.20 | 16.0 | 8.60 | 1.74 | 7667 | 64.5 |
| Embodiment 4 | 17.0 | 16.3 | 0.75 | 132.0 | 1.10 | 16.5 | 8.20 | 1.52 | 6778 | 45.6 |
| Embodiment 5 | 16.8 | 16.1 | 0.78 | 129.0 | 1.05 | 16.1 | 7.80 | 1.50 | 6701 | 43.9 |

Experiment 2, wherein five $CO_2$ capture agent application areas of 5 mu each were set up outdoors, one unused area (CK group as control) was 1 mu, the experimental area and the control area were planted at the same time, and the cucumbers in the experimental area were applied with $CO_2$ capture agent from April 30, In that five application area of $CO_2$ capture agent (5 mu), the experiments of embodiment 1 and embodiment 2 were conducted by directly apply the powder product to the water volume mass ratio (2 g/L), and spraying the amount of liquid product per mu of leaf surface is equivalent to 1 kg of liquid product, In that experiment of embodiment 3, embodiment 4, and embodiment 5, the liquid product was directly mixed with wat (liquid product:Water=1:30), the amount of the liquid product per mu was sprayed, and the botanical properties were investigated, and the observed indexes include plant height, stem girth, the number of functional leaves and leaf area, single melon weight and yield in the applied and non-applied areas, as shown in Table 4.

TABLE 4

Application results of $CO_2$ capture agents prepared in embodiments 1 to 5

| Embodiments | Leaf width (cm) | Leaf length (cm) | Stem circumference (cm) | plant height (cm) | Fruit number. (pieces) | Functional leaf number (slice) | Single melon weight (g) | Yield per plant (kg) | Yield per mu (kg) | increase the production % |
|---|---|---|---|---|---|---|---|---|---|---|
| CK | 14.95 | 15.00 | 0.60 | 124.0 | 0.65 | 16.0 | 7.0 | 1.22 | 4789 | / |
| Embodiment 1 | 17.1 | 15.6 | 0.70 | 156.2 | 0.90 | 17.0 | 7.20 | 1.41 | 5788 | 20.8 |
| Embodiment 2 | 17.3 | 16.5 | 0.71 | 162.4 | 0.94 | 17.1 | 8.0 | 1.54 | 6017 | 25.6 |
| Embodiment 3 | 17.8 | 16.9 | 0.78 | 179.5 | 1.15 | 17.5 | 8.80 | 1.80 | 7983 | 66.7 |
| Embodiment 4 | 17.5 | 16.7 | 0.73 | 164.0 | 1.05 | 17.0 | 8.50 | 1.73 | 7235 | 51.1 |
| Embodiment 5 | 17.0 | 16.3 | 0.74 | 158.9 | 1.10 | 17.0 | 8.20 | 1.65 | 6908 | 44.0 |

Experiment 3, five $CO_2$ capture agent application areas and one non-application area were set up in six greenhouses (CK group as control). The experimental area and the control area were planted at the same time. The pepper in the experimental area was applied with $CO_2$ capture agents from October 18th, and five $CO_2$ capture agent application areas were set up. The greenhouses in embodiment 1, embodiment 2 and embodiment 3 were directly watered according to liquid products (liquid products:water=1:30), and spraying on leaf surface per mu is equivalent to 1 kg of liquid products, while spraying on leaf surface per mu is equivalent to 1 kg of liquid products according to the volume-mass ratio of powdery products to water (2 g/L) in the greenhouses where embodiment 4 and embodiment 5 are located. According to the investigation of botanical characters, the observation indexes include the plant height, stem circumference, number and area of functional leaves, weight of single melon and yield of cucumber in applied and non-applied areas, as shown in Table 5.

The above is only a preferred embodiment of the present disclosure, and is not intended to limit the present disclosure. Any modification, equivalent substitution, improvement, etc. made within the spirit and principle of the present disclosure shall be included in the protection scope of the present disclosure.

What is claimed is:
1. A method for preparing a nano carbon dioxide capture agent, comprising:
   step (1), preparing an organic modified mineral soil solution: dissolving a mineral soil and a cationic surfactant in deionized water respectively, adding into a reaction kettle, heating and stirring, and adjusting pH to obtain an organic modified mineral soil solution; wherein the mass ratio of the mineral soil to the cationic surfactant is 3:1-1:1;
   step (2), preparing a modified chitosan solution: dissolving a chitosan in an acetic acid, adding the acetic aid into a reaction kettle, stirring and dissolving, dripping a cationic surfactant until the chitosan is completely dissolved, and adjusting pH to obtain the modified chitosan solution, wherein the mass ratio of the chitosan to the cationic surfactant is 9:1-11:1;
   step (3), dripping the modified chitosan solution into the organic modified mineral soil solution under a stirring condition, stirring for homogenization and ultrasonically dispersing, adjusting pH value to obtain an organic modified mineral soil loaded modified chitosan solution, filtering, drying and grinding to nanometer level, wherein the mass ratio of the modified chitosan solution to the organic modified mineral soil solution is 0.05-0.1;
   step (4), adding a graphene oxide into deionized water, stirring and dispersing to obtain a graphene oxide dispersion; filtering the organic modified mineral soil

TABLE 5

Application results of $CO_2$ capture agents prepared in embodiment 1 to embodiment 5.

| Embodiments | leaf area (cm2) | Stem thickness (cm) | plant height (cm) | Fruit setting rate (individual/plant) | pepper length (cm) | Pepper weight (g) | Yield per plant (kg) | Yield per mu (kg) | increase the production % |
|---|---|---|---|---|---|---|---|---|---|
| CK | 132.95 | 0.47 | 79.3 | 67 | 13.1 | 9.26 | 0.92 | 4600 | / |
| Embodiment 1 | 162.6 | 0.59 | 85.1 | 84.00 | 17.6 | 14.9 | 1.26 | 6327 | 37.5 |
| Embodiment 2 | 170.3 | 0.61 | 88.3 | 84.5 | 19.1 | 15.7 | 1.33 | 6633 | 44.2 |
| Embodiment 3 | 179.23 | 0.67 | 95.2 | 85.25 | 21.6 | 16.2 | 1.381 | 6905 | 20.8 |
| Embodiment 4 | 175.0 | 0.63 | 92.4 | 84.9 | 20.0 | 15.50 | 1.34 | 6700 | 50.1 |
| Embodiment 5 | 172.6 | 0.62 | 91.3 | 84.0 | 18.8 | 15.20 | 1.30 | 6500 | 41.0 | loaded modified chitosan solution obtained in the step (3) to nano level, adding the obtained organic modified mineral soil loaded modified chitosan nano level powder into the graphene oxide dispersion, reacting in a reactor, filtering, drying and grinding to nano level powder to obtain an organic modified mineral soil loaded modified chitosan and graphene oxide powder; wherein the mass ratio of the organic modified mineral soil loaded modified chitosan nano powder to the graphene oxide is 8:1-15:1;

step (5), dispersing a hydrotalcite in deionized water for full dissolution, adding the nano powder prepared in the step (4) slowly, adjusting pH until a precipitation of the mixed solution occurs, and uniformly dispersing by magnetic stirring to obtain a nano carbon dioxide capture agent, wherein the mass ratio of the nano powder to the hydrotalcite is 2:1-4:1.

2. The method of claim 1, wherein the cationic surfactant is one or more than two of dodecyl trimethyl ammonium bromide (DTAB), polydimethyldiallyl ammonium chloride (PDMDAAC), dodecyl dimethyl benzyl ammonium chloride, cetyl trimethyl ammonium chloride (CTAC), cetyl trimethyl ammonium bromide (CTAB), tetradecyl trimethyl ammonium bromide, octadecyl trimethyl ammonium bromide (CTMAB) and octadecyl trimethyl ammonium chloride (OTAC).

3. The method of claim 1, wherein a pH regulator for adjusting pH in the step (1) to (3) is an organic amine or an organic alcohol amine; in the step (5), K2CO3 or KOH is adopted for the pH adjustment.

4. The method of claim 3, wherein the organic amine or the organic alcohol amine is one or more than two of diethylenetriamine (DETA), triethylenetetramine (TETA), tetraethylene pentamine (TEPA), pentaethylene hexamine (PEHA), n-methyl-1, 3-diaminopropane (MAPA) and n, n-, 4-pyridine methylamine, N'-(pyridine-4-ylmethyl) ethane-1, 2-diamine, AMP-95, ethanolamine (MEA), diethanolamine (DEA), triethanolamine (TEA), tertiary amine N-methyl glycol amine (MDEA), N, N-diethylethanolamine (DEEA) and N-ethylethanolamine.

5. The method of claim 1, wherein the step (5) is prepared by hydrotalcite coprecipitation method, comprising: mixing and dispersing an Na2CO3, a K2CO3, a Mg(NO3)2·6H2O and an Al(NO3)3·9H2O uniformly at a ratio of 3.5:0.5:0.5: 1.2:1.0, and dissolving at a ratio of 100 g/L in deionized water.

6. The method of claim 1, wherein the mineral soil is one or more than two of a rare earth, a diatomite, an attapulgite, a bentonite, a kaolin or a montmorillonite, and the fineness reaches nanometer level; the mineral soil and the cationic surfactant are respectively dissolved in deionized water with a concentration of 10-15 g/l; in the reaction kettle, the stirring speed is 400-600 r/min, and the temperature is 60-80° C., and the mixture is heated and stirred for 1-3 hours.

7. The method of claim 1, wherein in the step (2), the mass concentration of the acetic acid is 3-8%, and the mass concentration of the chitosan dissolved in the acetic acid is 50-200 g/l; the stirring speed in the reaction kettle is 400-600 r/min, and the chitosan is completely dissolved by heating and stirring at 50-80° C.

8. The method of claim 1, wherein in the step (3), dripping the modified chitosan solution into the organic modified mineral soil solution at a stirring speed of 400-600 r/min and a temperature of 50-80° C., stirring for 2 hours, then introducing into a homogenizer, and uniformly dispersing for 6-15 hours at a rotating speed of 12,000-16,000 r/min, adjusting pH to 7.5-8.2 to obtain an organic modified mineral soil loaded modified chitosan solution, filtering, drying at 80-120° C. for 1-2 hours, and introducing into a nano grinder for grinding to nanometer level; or in the step (4), the mass concentration of the graphene oxide dispersed in deionized water in the step (4) is 1-2 g/L, and ultrasonic dispersion is performed for 1.5-2.5 hours; in a microwave reactor, the microwave power is 800-1000 w and the microwave radiation time is 15-25 min; the drying is at 80-120° C. for 1-2 hours; the grinding time is 1-2 hours.

9. The method of claim 1, further comprising a pulverize step of transferring the nano carbon dioxide capture agent mixed solution obtained in the step (5) into a reaction kettle with a jacket, performing a hydrothermal reaction at 100-120° C. for 30-40 hours, fully washing with an absolute ethyl alcohol and deionized water, performing a suction filtration, freeze drying, and introducing into a nano grinder for grinding for 1-2 h to obtain a powdery nano composite product.

10. A nano carbon dioxide capture agent prepared by the method claim 1 as a fertilizer for enhancing plant photosynthesis or an application in a fertilizer for enhancing plant photosynthesis.

* * * * *